J. A. WILLIAMS.
BRAKE.
APPLICATION FILED JUNE 21, 1913.
1,101,370.
Patented June 23, 1914.
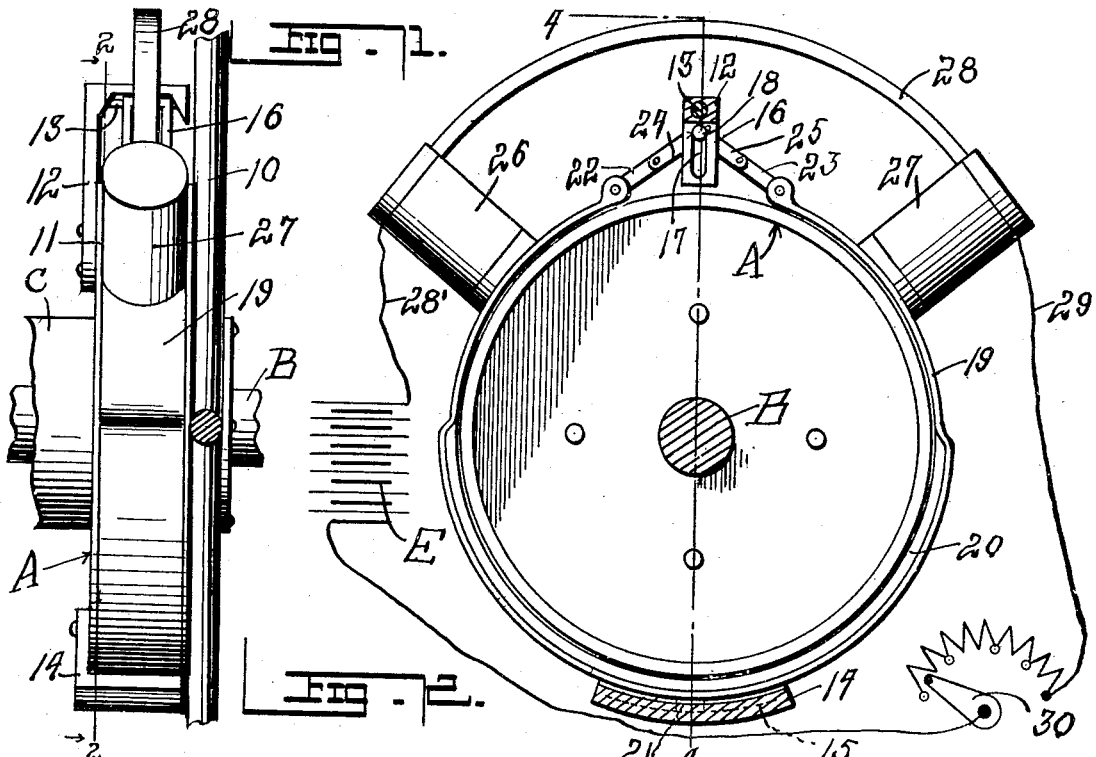
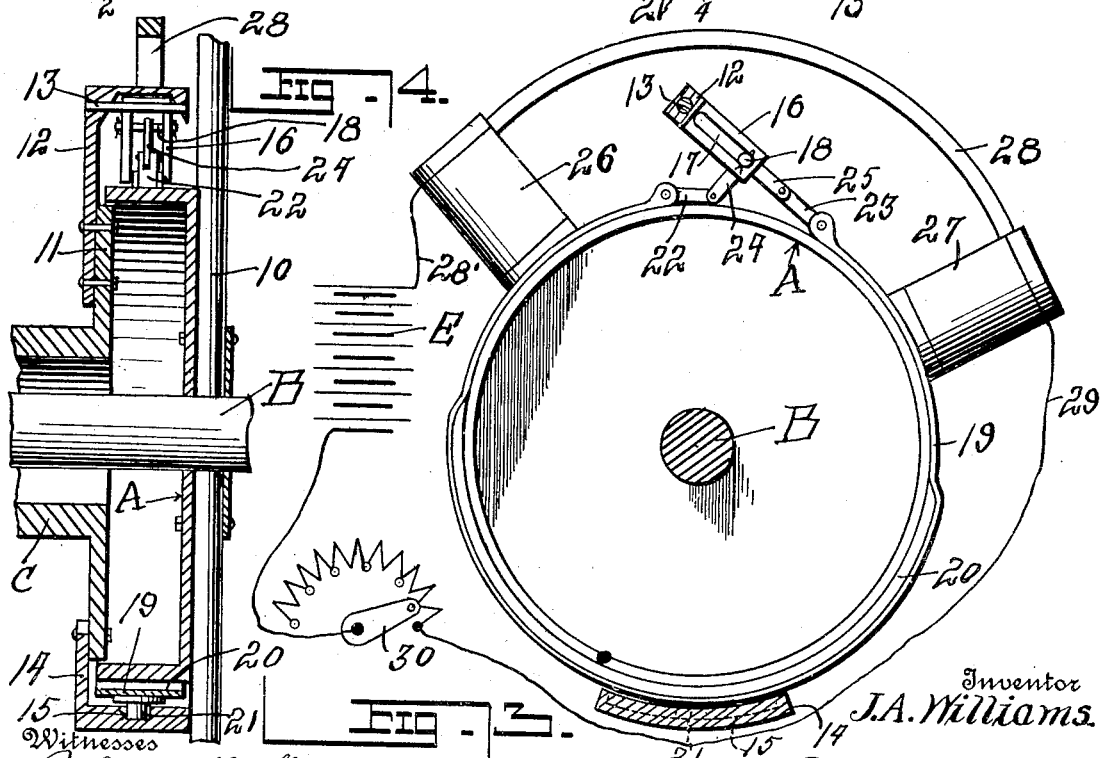
Witnesses
Roland T. Williams.
Henry T. Bright
Inventor
J. A. Williams.
By
Attorneys

UNITED STATES PATENT OFFICE.

JOHN A. WILLIAMS, OF McCOLL, SOUTH CAROLINA.

BRAKE.

1,101,370.  Specification of Letters Patent.  Patented June 23, 1914.

Application filed June 21, 1913. Serial No. 775,018.

*To all whom it may concern:*

Be it known that I, JOHN ALBERT WILLIAMS, a citizen of the United States, residing at McColl, in the county of Marlboro, State of South Carolina, have invented certain new and useful Improvements in Brakes; and I do hereby declare the following to be a full, clear, and exact description of the invention, such as will enable others skilled in the art to which it appertains to make and use the same.

This invention relates to brakes and particularly to the band type used on automobiles.

The object of the invention resides in the provision of a brake of the character named which is designed to be magnetically controlled and operated through the medium of an electric circuit supplied from the source which maintains the lighting and the ignition of the engine of an automobile.

With the above and other objects in view the invention consists in details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a front elevation of a brake constructed in accordance with the invention; Fig. 2, a section on the line 2—2 of Fig. 1. Fig. 3, a view similar to Fig. 2 showing the parts in the position they would occupy when the brake is applied, and Fig. 4, a section on the line 4—4 of Fig. 2.

Referring to the drawings 10 indicates an automobile wheel which has secured thereto in the usual and well known manner a brake drum A. The wheel 10 is fixed to an axle B which is surrounded by a casing C provided with a flange 11 disposed adjacent the inner end of the drum A. Mounted on the flange 11 is an L-shaped arm 12 which carries a pin 13 extending over the periphery of the drum A. Also mounted upon the flange 11 is one arm of an L-shaped plate 14, the other arm of said plate being disposed parallel to the periphery of the drum and provided with a slot 15 for a purpose that will presently appear. It will be noted that the arm 12 is disposed diametrically opposite to the plate 14 said arm 12 being at the upper end A, while the plate 14 is at the lower end thereof. Pivoted upon the pin 13 is a frame 16 the opposite side members of which are provided with longitudinal slots 17 respectively and slidably engaged in these slots is a pivot pin 18. Surrounding the periphery of the drum A is a brake band 19 the intermediate portion of which is offset to form a seat for a brake shoe 20 the inner face of said brake shoe registering with the inner face of the terminal portions of the brake band 19. Projecting outwardly from the brake band 19 is a stud 21 which extends into the slot 15 and is movable in said slot during the operation of the brake. The terminals of the brake band 19 have pivotally connected thereto respectively links 22 and 23. These links are in turn respectively connected to the pivot pin 18 by means of links 24 and 25. Mounted upon the brake band 19 adjacent the ends thereof respectively are magnets 26 and 27 the coils of which are connected to each other by a conductor 28 and also connected to a suitable source of electricity E by conductors 28' and 29 respectively. Included in the circuit which energizes the magnets 26 and 27 is a rheostat 30 whereby the strength of the magnets 26 and 27 may be readily controlled. This rheostat may be situated at any convenient point on the automobile such as the steering column.

In the operation of the brake it will be apparent that when the rheostat is operated to close the circuits of the magnets 26 and 27 said magnets will be energized and attracted to the periphery of the frame A. This movement of the magnets 26 and 27 will carry a portion of the band 19 into engagement with the drum A and the friction arising between the frame and band will cause the latter to respond to the rotation of the drum which response is arrested by the links 22, 23, 24 and 25 with the result that the band will pull the brake shoe against the periphery of the drum A with sufficient force to produce the proper brakage. It will be noted that through the medium of the rheostat 30 the force with which the brake shoe 20 is applied to the drum may be readily controlled.

What I claim is:—

1. In combination with a rotatable element, of a drum fixed to the element, a band surrounding the drum, an arm secured to a relatively fixed part, a stud carried by the arm and overlying the periphery of the drum, a slotted member pivoted on said stud, a pin movable in the slot of said member, flexible connection between the pin and respective ends of the band, and an electrically operated means for forcing the band into engagement with the drum.

2. In combination with a rotatable element, of a drum fixed to the element, a band surrounding the drum, an arm secured to a relatively fixed part, a stud carried by the arm and overlying the periphery of the drum, a slotted member pivoted on said stud, a pin movable in the slots of said member, flexible connection between the pin and respective ends of the band, magnets mounted on the band adjacent each end thereof, and means for energizing said magnets.

In testimony whereof, I affix my signature, in the presence of two witnesses.

JOHN A. WILLIAMS.

Witnesses:
F. F. ADAMS,
W. R. FLETCHER.